United States Patent
Koo et al.

(10) Patent No.: US 7,587,383 B2
(45) Date of Patent: Sep. 8, 2009

(54) REDUNDANT JOIN ELIMINATION AND SUB-QUERY ELIMINATION USING SUBSUMPTION

(75) Inventors: Fred Koo, Thornhill (CA); Ting Y. Leung, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 1390 days.

(21) Appl. No.: 10/377,896

(22) Filed: Feb. 27, 2003

(65) Prior Publication Data

US 2003/0167258 A1    Sep. 4, 2003

(30) Foreign Application Priority Data

Mar. 1, 2002    (CA)    ................................. 2374271

(51) Int. Cl.
*G06F 7/00*    (2006.01)
*G06F 17/30*    (2006.01)
(52) U.S. Cl. .................................. 707/2; 707/3; 707/4
(58) Field of Classification Search .................. 707/2–4
See application file for complete search history.

(56) References Cited

U.S. PATENT DOCUMENTS

| | | | |
|---|---|---|---|
| 5,546,576 A | 8/1996 | Cochrane et al. | |
| 5,649,192 A | 7/1997 | Stucky | |
| 5,659,725 A | 8/1997 | Levy et al. | |
| 5,819,255 A * | 10/1998 | Celis et al. | 707/2 |
| 5,864,847 A | 1/1999 | Goel et al. | |
| 5,873,075 A | 2/1999 | Cochrane et al. | |
| 5,875,334 A | 2/1999 | Chow et al. | |
| 5,875,447 A | 2/1999 | Goel et al. | |
| 5,987,455 A | 11/1999 | Cochrane et al. | |
| 6,032,144 A * | 2/2000 | Srivastava et al. | 707/3 |
| 6,199,063 B1 * | 3/2001 | Colby et al. | 707/4 |
| 6,339,768 B1 | 1/2002 | Leung et al. | 707/2 |

(Continued)

OTHER PUBLICATIONS

Processing Queries with Quantifiers, by: Umeshwar Dayal, Published: 1983, p. 125-136. http://delivery.acm.org/10.1145/590000/588075/p125-dayal.pdf?key1=588075&key2=8045577211&coll=GUIDE&dl=GUIDE&CFID=53813562&CFTOKEN=49420716.*

(Continued)

*Primary Examiner*—Apu M Mofiz
*Assistant Examiner*—Chelcie Daye
(74) *Attorney, Agent, or Firm*—Sawyer Law Group, P.C.

(57) ABSTRACT

A method, computer readable medium, and system for optimizing a query in a relational database processing system is disclosed. The present invention relates to a query rewrite optimization method for eliminating a redundant join and equivalent subquery in an SQL query before generation and selection of the optimal query execution plan. The method of the present invention includes evaluating the query to identify a join predicate joining a sub-expression of the query to itself, and determining whether a row set producible from a first set of references of the query to the sub-expression is subsumed by a row set producible from a second set of references of the query to the sub-expression. Based on such evaluation and determination, the query may be reformed to eliminate the join predicate and the second quantifier. A further determination of the removability of the second quantifier may be required such as by evaluating a cardinality constraint when query output cardinality is material.

27 Claims, 2 Drawing Sheets

U.S. PATENT DOCUMENTS

| | | | |
|---|---|---|---|
| 6,345,272 | B1 | 2/2002 | Witkowski et al. |
| 6,529,896 | B1 | 3/2003 | Leung et al. ............... 707/2 |
| 6,560,595 | B1 * | 5/2003 | Sanders et al. ............ 707/2 |

OTHER PUBLICATIONS

"Optimization Using Tuple Subsumption", by: Harinarayan and Gupta, Published 1998. http://lib.nau.edu.ua/acm/disk1/text/2-2/ICDT1995/P338.pdf.*

"Optimization Using Tuple Subsumption", by: Venky Harinarayan and Ashish Gupta, Published 1998 http://www.springerlink.com/content/y37476172x6523u1/fulltext.pdf.*

"Query Subsumption", by: Mohammad Al-Qasem and S. Misbah Deen, Published 1998 http://www.springerlink.com/content/7xI8I7w654wjjfmv/fulltext.pdf.*

"A Multi-Query Optimizer for Monet", by: Stefan Manegold, Published 1994 http://www.springerlink.com/content/kpm27352qry46jmm/fulltext.pdf.*

Bhargava, Gautam et al., "Hypergraph Based Reorderings of Outer Join Queries with Complex Predicates," ACM 1995, pp. 304-315.

Kozlov, Alexander V. et al., "Computational Complexity Reduction for BN2O Networks Using Similarity of States," Computational Complexity Reduction, pp. 357-364.

Ravada, Sivakumar et al., "Optimizing Join Index Based Join Processing: A Graph Partitioning Approach," Computer Science Department, University of Minnesota, 7 pgs.

Shin, Hyoseop et al., "Design and Implementation of OQL Query Optimizer Considering Total Ordering of Implicit and Explicit Joins," British Library, pp. 810-819.

* cited by examiner

REDUNDANT JOIN ELIMINATION AND SUB-QUERY ELIMINATION USING SUBSUMPTION

CROSS-REFERENCE TO RELATED APPLICATIONS

This application claims benefit under 35 USC §119 of Canadian Application No. 2,374,271, filed on Mar. 1, 2002.

FIELD OF THE INVENTION

This invention relates generally to systems for query optimization in relational database management systems and, more particularly, to redundant join elimination and sub-query elimination using subsumption.

BACKGROUND OF THE INVENTION

One popular form of computerized record-keeping system is the relational database. Between the actual database (i.e., the data as stored for use by a computer) and the users of the system is a software layer known as the relational database management system (RDBMS). The RDBMS is responsible for handling all requests for access to the database, shielding the users from the details of any specific hardware implementation. Using relational techniques, the RDBMS stores, manipulates and retrieves data in the form of table-like relations typically defined by a set of columns or attributes of data types and a set of rows (i.e., records or tuples) of data. The columns may further include restrictions on their data content (i.e., valid domains) and may be designated as a primary key or unique identifier for the relation or a foreign key for one or more other relations.

The standard language for dealing with relational databases implemented by most commercial RDBMSs is the Structured Query Language or SQL. SQL includes both data definition operations and data manipulation operations. In order to maintain data independence a query (i.e., a set of SQL commands) instructs the RDBMS what to do but not how to do it. Thus, the RDBMS includes a query processor for generating various query plans of execution and choosing the cheapest plan. Due to the high-level nature of relational expressions and a variety of implementation techniques, automatic query optimization is possible and often necessary to ensure more efficient query processing.

In accordance with well known query translation processes, an SQL query is processed in stages. The initial stage casts the source query into an internal form such as the Query Graph Model (QGM) following the preliminary steps of lexing, parsing and semantic checking. The goal of the QGM is to provide a more powerful and conceptually more manageable representation of queries in order to reduce the complexity of query compilation and optimization. The internal QGM is a data structure for providing the semantic relationships of the query for use by query translator and optimizer components for rewriting the query in a canonical form. In a next phase, a plan optimizer produces a query execution plan such as by generating alternate plans and choosing a best plan based on estimated execution costs. Finally, a plan refinement stage may be employed to refine the optimum execution plan in accordance with run-time requirements.

SQL query compilation and optimization techniques using the Query Graph Model (QGM) are well known to those skilled in the art and include the teachings of Hamid Pirahesh, Joseph Hellerstein, and Waqar Hasan, "Extensible/Rule Based Query Rewrite Optimization in STARBURST," Proceedings of ACM SIGMOD '92 International Conference on Management of Data, San Diego, Calif., 1992, incorporated by reference herein (hereinafter Pirahesh et al.). One QGM as discussed in Pirahesh et al. is described briefly herein.

The structure of the QGM is central to the query rewrite mechanism, since "rewriting" a query corresponds to transforming its QGM. The QGM is a graph of nodes (or "boxes"), each representing a table operation whose inputs and outputs are tables. Examples of such operations are SELECT, GROUPBY, UNION, LEFT JOIN, INTERSECT and EXCEPT. In our terminology, the operation SELECT incorporates selection, projection and join (i.e., the simple unnested "SELECT, FROM and WHERE" clauses in SQL). The number of QGM boxes in a query typically ranges from 2 to 40.

A useful QGM known in the art is described by example. FIG. 1 illustrates a graphical representation of a QGM for the following SQL query:

```
SELECT DISTINCT Q1.PARTNO, Q1.DESCR, Q2.SUPPNO
FROM INVENTORY Q1, QUOTATIONS Q2
   WHERE Q1.PARTNO = Q2.PARTNO AND Q1.DESCR = 'ENGINE'
      AND Q2.PRICE <= ALL (SELECT Q3.PRICE
         FROM QUOTATIONS Q3
            WHERE Q2.PARTNO=Q3.PARTNO)
```

This query provides information about suppliers and parts for which the supplier's price is less than that of ALL other suppliers. FIG. 1 shows five boxes or nodes on a QGM graph 10. Boxes 12 and 14 are associated with base tables INVENTORY and QUOTATIONS. Box 16 is a SELECT box associated with the main part of the query and box 18 is a SELECT box associated with the sub-query. Box 20 (i.e., Top node) represents the data output table requested by the query. Each box 12, 14, 16, 18 and 20 has two main components a head and a body. Each head (for example head 22 of box 16) describes the output table produced by the box and each body (for example body 24 of box 16) specifies the operation required to compute the output table. Base tables have empty or nonexistent bodies.

With reference to box 16, head 22 specifies output columns PARTNO, DESCR and SUPPNO, as specified in the SELECT list of the query. The specification of these columns includes column names, types, and output ordering information (not shown). The head 22 includes a Boolean attribute called DISTINCT that indicates whether the associated table contains only distinct tuples (head.distinct=TRUE), or whether it may contain duplicates (head.distinct=FALSE).

The body of a box contains a graph where the vertices represented by darkened circles in FIG. 1 represent quantified tuple variables, called QUANTIFIERS. Box 16 includes quantifiers q1, q2, and q4 (respectively 30, 32 and 34). Quantifiers q1 30 and q2 32 range over (i.e., read from) the base tables INVENTORY 12 and QUOTATIONS 14 respectively, and correspond to the table references in the FROM clause of the SQL query. Vertices q1 30 and q2 32 are connected via respective interbox edges 38 and 40 to the heads of the INVENTORY 12 and QUOTATIONS 14 boxes. The edge 42 between q1 30 and q2 32 specifies the join predicate. The loop edge 44 attached to q1 30 is the local predicate (Q1.DESCR='ENGINE') on q1 30. Each interquantifier edge represents a conjunct of the WHERE clause in the query block the conjuncts being represented in the diagram by the labeled rectangle along the edge. Such edges are also referred to as Boolean factors. Quantifier q4 is a UNIVERSAL quantifier, associated with the ALL sub-query in the WHERE clause. This represents that for ALL tuples associated with q4, the predicate represented by the edge between q2 32 and q4 34 is TRUE.

In Box 16, q1 30 and q2 32 participate in joins, and some of their columns are used in the output tuples. These quantifiers have type F (ForEach), since they come from the query's FROM clause. Quantifier q4 34 has type A, representing a UNIVERSAL (ALL) quantifier. SQL's predicates EXISTS, IN, ANY and SOME are true if at least one tuple of the sub-query satisfies the predicate. Hence, all of these predicates are EXISTENTIAL, and the quantifiers associated with such sub-queries have type E. Each inter-box edge is labeled with the quantifier columns that the edge provides from the table the quantifier ranges over. Additionally, quantifiers may be ordered within a box to support asymmetric operators, such as EXCEPT. In QGM, the quantifiers associated with existential and universal sub-queries are called COUNTING quantifiers. SCALAR sub-query quantifiers have the type S, requiring that (1) the sub-query returns at most one row and (2) if the sub-query does not produce any row, a null value will be returned via the S quantifier.

Box 18 represents the subquery SELECT Q3.PRICE FROM QUOTATIONS Q3 WHERE Q2.PARTNO=Q3.PARTNO. Quantifier q3 46 is of type F and ranges over the base table QUOTATIONS 12. Box 18 includes a predicate 48 (Q2.PARTNO=Q3.PARTNO) that refers to q2 32 and q3 46.

The body of every box has an attribute called DISTINCT that has a value of ENFORCE, PRESERVE or PERMIT. ENFORCE means that the operation must eliminate duplicates in order to enforce head.distinct=TRUE. PRESERVE means that the operation must preserve the number of duplicates it generates. This could be because head.distinct=FALSE, or because head.distinct=TRUE and no duplicates could exist in the output of the operation even without duplicate elimination. PERMIT means that the operation is permitted to eliminate (or generate) duplicates arbitrarily. For example, the DISTINCT attribute of Box 18 can have the value PERMIT because its output is used in universal quantifier q4 34 of box 16, and universal quantifiers are insensitive to duplicate tuples.

Like each box body, each quantifier q1, q2, q3, and q4 (30, 32, 46 and 34 respectively) also has an attribute called DISTINCT (not shown) that has a value of ENFORCE, PRESERVE or PERMIT. ENFORCE means that the quantifier requires the table over which it ranges to enforce duplicate elimination. PRESERVE means that the quantifier requires that the exact number of duplicates in the lower table be preserved. PERMIT means that the table below may have an arbitrary number of duplicates. Existential and universal quantifiers can always have distinct=PERMIT, since they are insensitive to duplicates.

In the body, each output column may have an associated expression corresponding to expressions allowed in the select list of the query. These expressions are called head expressions. In FIG. 1, all of these expressions are simply identity functions over the referenced quantifier columns.

DB2™ from IBM Corporation supports derived tables, which are similar to VIEW definitions, and can be defined anywhere a table can be used. In DB2, derived tables and VIEWs, just like queries and sub-queries, have a QGM, with one or many boxes. When a derived table or VIEW is referenced in a query, its QGM becomes part of the QGM graph of the query.

The output of a box can be used multiple times (e.g., a VIEW may be used multiple times in the same query), creating common sub-expressions.

A particular QGM optimization technique termed "subsumption" has been discussed extensively in many research literature and has been widely used. Subsumption is particularly useful for the rewriting of a query to use an existing materialized view, as disclosed in the following publications [incorporated herein by reference]: L. S. Colby, R. L. Cole, E. Haslam, N. Jazaeri, G. Johnson, W. J. McKenna, L. Schumacher, D. Wilhite, Red Brick Vista: Aggregate Computation and Management, Proceedings of the 14th Int'l, Conference on Data Engineering, Orlando, Fla., 1998. R. Bello, K. Dias, A. Downing, J. Feenan, J. Finnerty, W. Norcott, H. Sun, A. Witkowski, M. Ziauddin, Materialized Views In Oracle, Proceedings of the 24th VLDB Conference, New York, 1998, D. Srivastava, S. Dar, H. Jagadish, A. Levy, Answering Queries with Aggregation Using Views, Proceedings of the 22nd VLDB Conference, Mumbai, India, 1996.

In accordance with a query represented by a QGM graph, SELECT box X is said to be subsumed by another SELECT box Y, if the result set of X is a subset of the result set of Y and if the output column set of X is a subset of the output column set of Y. In other words, the result set of X can be rederived using the result set of Y. A simple subsumption situation arises when the predicate set in box X is a superset of the predicate set in Y. The SELECT box X will filter out more rows since it has more predicates than the box Y. For example, consider the following queries L1 and M1:

L1: SELECT * FROM T WHERE C1 >0 AND C2>0
M1: SELECT * FROM T WHERE C1 >0

The result set produced by L1 is a subset of the result set produced by M1. The reason is that both queries select rows from the same table T (i.e., T is a common sub-expression), and all predicates in M1 appear in L1. Hence, M1 subsumes L1.

Another simple situation is when the predicate set in box X is more restrictive than the predicate set in Y. For example, consider the following additional query L2:

L2: SELECT * FROM T WHERE C1 > 10

The result set produced by L2 is a subset of the result set produced by M1, and therefore M1 subsumes L2 in addition to subsuming L1.

Query subsumption, in terms of predicate sets, can be defined as follows using query blocks. Assume that a SELECT box L with a single quantifier Q ranges over a common sub-expression (e.g., a table) T, and another SELECT box M with a quantifier Q' ranges over the same table T, wherein the quantifiers Q and Q' comprise the table references of the SELECT boxes. In the above example, the predicate sets in L1, L2 and M1 are:

L1: Q.C1>0 and Q.C2>0

L2: Q.C1>10

M1: Q'.C1>0

A predicate can be mapped into another predicate by mapping the column references between two quantifier sets. For example, the predicate set in M1 can be mapped from {Q'} to {Q} resulting in:

M1: Q.C1>0

Now, subsumption can be defined precisely on predicates mapped via quantifiers:

If the predicate set in M mapped from {Q'} to {Q} is less restrictive than the predicate set in L, then L is subsumed by M. That is L is a subsumee and M is a subsumer.

In other words, all the rows produced by L can be found in the result set produced by M.

As mentioned above, the result set by the subsumee can be rederived from the subsumer. In the above examples, in order to obtain the result sets of L1 and L2, one must apply the respective compensation predicates "C2>0" and "C1>10" on the result set of M1.

A query optimization technique for redundant join elimination has also been disclosed in Query Rewrite Optimization in STARBURST," Proceedings of ACM SIGMOD '92 International Conference on Management of Data, San Diego, Calif., 1992 referred to above. Essentially, if a self join on a table and the join condition involves the primary key of the table, then the join can be removed because the join is really always one-to-one tuple matching between the two references of the given table.

Despite these known optimization techniques of subsumption and redundant join elimination, there is further need to optimize queries by eliminating redundant joins when the join conditions do not involve the primary keys.

SUMMARY OF THE INVENTION

It is the object of the invention to provide a query rewrite optimization technique for a computer-implemented database management system. It is a further object to provide such a technique that eliminates a redundant join and equivalent sub-query using subsumption techniques.

In accordance with an aspect of the present invention, there is provided a method for optimizing a query in a relational database processing system. The method includes the steps of (a) evaluating the query to identify a join predicate joining a sub-expression of the query to itself where the join predicate includes an equality test between a same quantifier column of the sub-expression; (b) determining whether a row set producible from a first set of references of the query to the sub-expression is subsumed by a row set producible from a second set of references of the query to the sub-expression; and (c) reforming the query to eliminate the join predicate in response to the steps of evaluating and determining. Additionally, the method may further include the step of determining the removability of the second set of references from the query, wherein the step of reforming is further responsive to the step of determining the removability.

In accordance with yet another aspect of the present invention, where the query includes first and second quantifiers each ranging over the sub-expression, the step of determining the removability is responsive to the step of detecting, as an output of the query, a reference to one or more quantifier columns relative to said second quantifier. Preferably, in response to said detecting, the query may be reformed to replace the reference to the one or more quantifier columns relative to the second quantifier. In accordance with yet another aspect of the present invention, the step of determining the removability is responsive to the step of detecting a cardinality condition of an output of the query.

Preferably, in accordance with yet another aspect of the invention where the query includes first and second quantifiers each ranging over the common sub-expression, the step of reforming the query includes the step of removing the second quantifier from the query. Moreover, the step of reforming may include the step of rewriting the first set of references in response to the elimination of the join predicate.

In accordance with yet another aspect of the present invention, the sub-expression may consist of a base table, materialized view or a derived table.

In accordance with further aspects of the present invention there is provided an apparatus such as a query optimizer system and a database system as well as articles of manufacture such as a computer readable medium having program instructions recorded thereon for practicing the method of the invention.

BRIEF DESCRIPTION OF THE DRAWINGS

Further features and advantages of the embodiments of the present invention will become apparent from the following detailed description, taken in combination with the appended drawings, in which.

It will be noted that throughout the appended drawings, like features are identified by like reference numerals.

DETAILED DESCRIPTION

Figure 1:
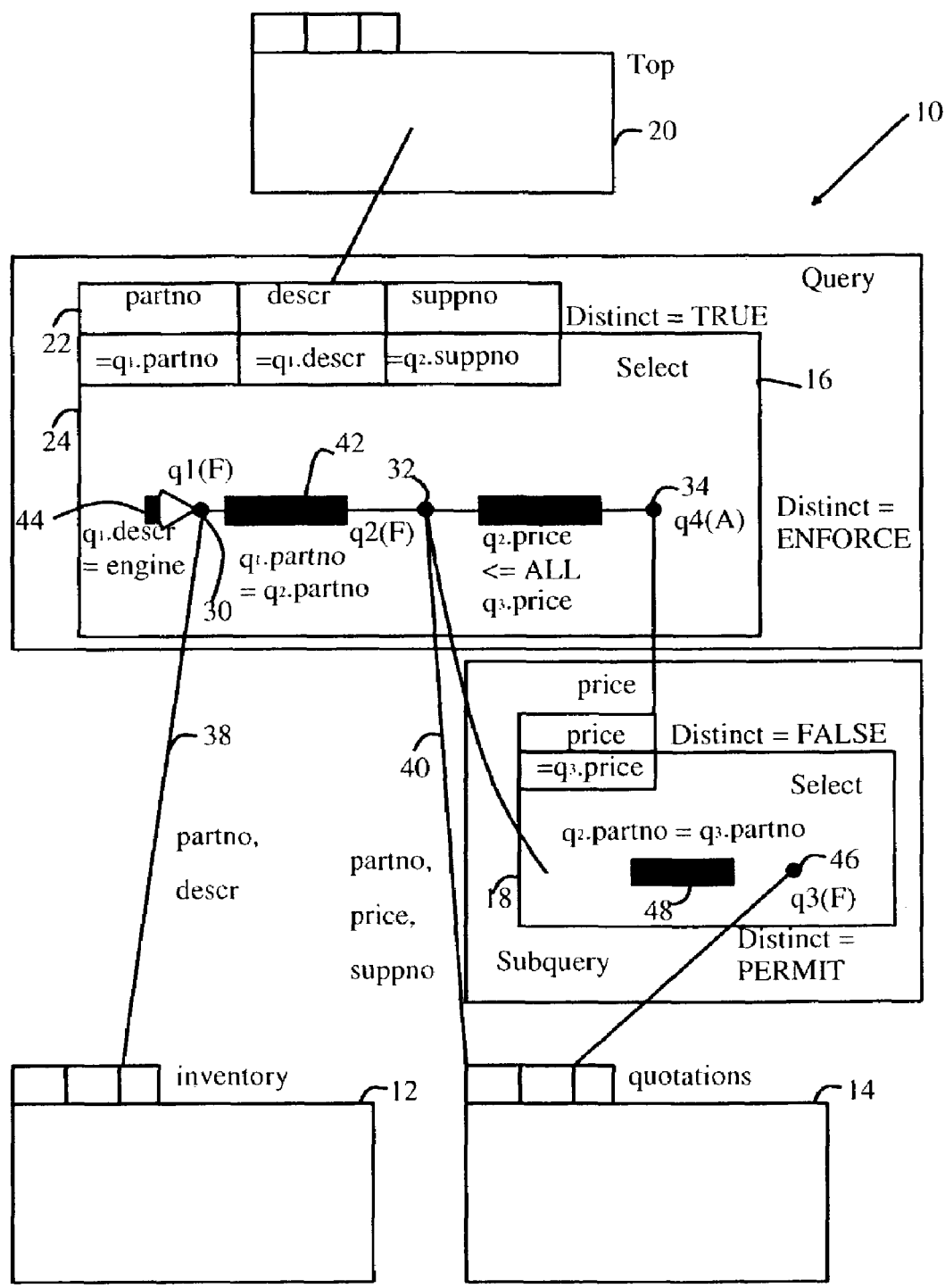
FIG. 1 is a block diagram of a Query Graph Model (QGM) for an exemplary SQL query in accordance with the prior art.

A method according to an embodiment of the present invention may be incorporated in a relational database management system (RDBMS) that employs a process for query optimization, such as QGM based optimizations, for directing a computer-implemented database processing system to achieve desired functions and tasks as will be explained below. The computer implementation includes a computer processing unit (CPU) coupled to interfacing devices for receiving user queries and for displaying results of the user queries. User queries typically include a combination of SQL commands for requesting the computer system to produce tabular output data. The CPU is coupled to storage space for containing programs and data such as base tables or virtual tables such as views or derived tables (i.e., tables determined from one or more base tables according to VIEW or other definitions). The storage space may comprise a variety of storage devices including internal memory and external mass storage typically arranged in a hierarchy of storage as understood by those skilled in the art.

The database processing system includes a control program stored in memory for directing the CPU to manage components related to the database processing system. The components include a component having instructions for directing the CPU to receive a query from a user, and a component having instructions for directing the CPU to process the user query in accordance with a Query Graph Model including query optimization process. Additional components have instructions for directing the CPU to perform query plan determination including generating, costing and selecting a query plan as well as executing a preferred query plan. The foregoing description is exemplary only and the method of the present invention may be incorporated in any RDBMS that employs the process of query optimization, particularly QGM-based optimization.

In accordance with a method provided by an aspect of the present invention, queries including particular join operations may be optimized using the subsumption technique. Consider a query including a join predicate joining first and second quantifiers that each range over the same sub-expression in a QGM graph, such as a base table, materialized view or derived table. In the query, each quantifier has a respective predicate set for determining the resulting row set of the query. If the join condition is an equality test between the same quantifier columns of the common table, the query may be reformed to eliminate the second quantifier. The query may be reformed when the row set determined by query predicates for the first quantifier is subsumed by the row set determined by query predicates for the second quantifier.

Consider the following user query command for creating a table:

CREATE TABLE T (KEY int not null primary key, C1 int, C2 int, C3 int)

Without a loss of generality, it is assumed that table T has a primary key column (KEY) and all column data types are integer. In accordance with other embodiments of the present invention, the optimization techniques can be applied to other data types or tables that lack a key column (that is, the key column is not present).

Consider a query which selects the rows in table T whose column values C2 and C3 are greater than 10 and wherein the IN sub-query is satisfied:

```
SELECT DISTINCT P.KEY, P.C1, P.C2, P.C3
FROM TABLE P
    WHERE P.C2 > 10 AND P.C3 > 10
        AND P.C1 IN (SELECT Q.C1
            FROM TABLE Q
            WHERE Q.C2 > 0)
```

The above sub-query can be flattened into a join. The equivalent flattened query becomes:

```
SELECT DISTINCT P.KEY, P.C1, P.C2, P.C3
FROM TABLE P, TABLE Q
    WHERE P.C2 > 10 AND P.C3 > 10
        AND P.C1 = Q.C1 AND Q.C2 > 0
```

The join from the query can be removed to further optimize the query. That is, the quantifier Q can be removed because the following observations can be made:

1. the join is based on the same quantifier column of the common table (C1), i.e., the join condition resolves to "P.C1=P.C1";
2. the set of rows that satisfy the predicates "P.C2>10 AND P.C3>10" is a subset of the rows that satisfy the predicate "Q.C2>0", or equivalently for the sub-query case, every outer row must also appear in the sub-query, and thus the sub-query is always true (except when P.C1 value is NULL);
3. moreover, the removability of Q can be assured because:
    a) eliminating Q neither increases nor decreases the output cardinality of the result set due to the presence of the DISTINCT operator; and
    b) columns from Q are not selected for output.

Based on the above observations, the sub-query (or equivalent join) may be safely removed with the result:

```
SELECT DISTINCT P.KEY, P.C1, P.C2, P.C3
FROM TABLE P
    WHERE P.C2 > 10 AND P.C3 > 10
        AND P.C1 IS NOT NULL
```

In the situation where P.C1 is declared as not nullable in the create table statement, as above, the query can further be simplified as is understood to persons skilled in the art. Additional query optimization techniques can be further applied without changing the correctness of this rewritten query.

Consider a more general query case with the following sub-query:

```
SELECT DISTINCT P.KEY, P.*
FROM T P
    WHERE Pred(P)
        AND P.C1 IN (SELECT Q.C1
            FROM T Q
            WHERE Pred(Q))
```

In the example, Pred(P) is a set of predicates on table T in the main query block and Pred(Q) is a set of predicates on table T in the sub-query. Equivalently, this sub-query may be flattened to:

```
SELECT DISTINCT P.KEY, P.*
FROM T P,T Q
    WHERE P.C1 = Q.C1 AND Pred(P) AND Pred(Q)
```

If, after quantifier mapping, the predicate set Pred(Q) subsumes Pred(P) in terms of row set produced, the query can be simplified, removing the join predicate and the references to quantifier Q and rewriting the predicate set for quantifier P:

```
SELECT DISTINCT P.KEY, P.*
FROM T P
    WHERE Pred(P) AND P.C1 IS NOT NULL
```

Figure 2:
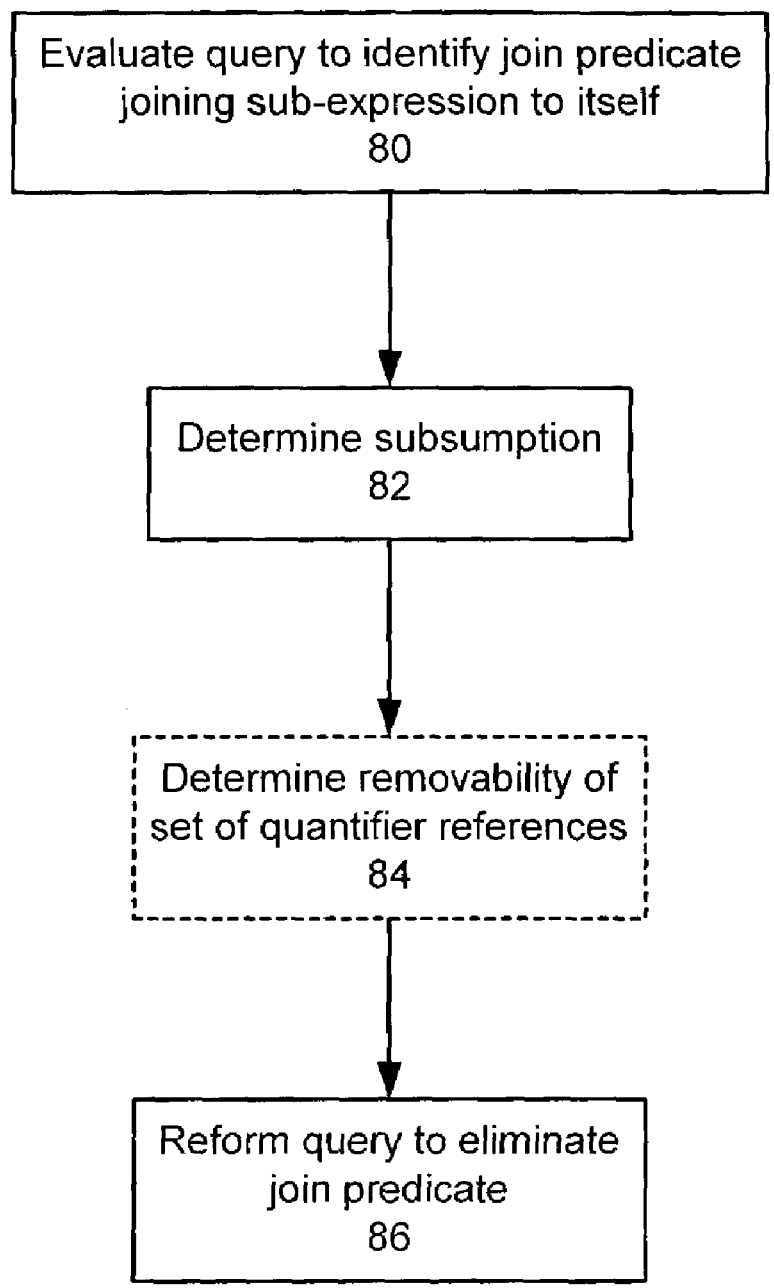
FIG. 2 is flow chart for a sequence of steps according to the method of the invention.

FIG. 2 is a flow chart illustrating one sequence of operations that is useful in accordance with an embodiment of the present invention for determining conditions for a redundant join elimination using subsumption to optimize a query. It is understood that the sequence of operations may be performed in association with one or more query "re-writes" performed in accordance with other optimization techniques.

At block 80, a query is evaluated to identify the presence of a join predicate condition joining a sub-expression of the query to itself. The sub-expression (e.g., a base table or virtual table such as a materialized view or derived table) is referenced by two regular 'F' quantifiers ranging over the sub-expression. The exemplary quantifiers are denoted P and Q. The join predicate condition is evaluated to determine whether the join predicate condition is an equality test between the same quantifier columns of the sub-expression. That is, the join columns must be the same, for example, $P.C_1 = Q.C_1$.

At block 82, a determination is made whether a row set producible by predicate set Pred(P) (i.e., a first set of references to the sub-expression) is subsumed by the row set producible by the predicate set Pred(Q) (i.e., a second set of references to the sub-expression), as discussed previously. In accordance with an embodiment of the present invention, the query may be reformed to remove the join predicate and the references to the quantifier Q (in block 86) if the result set of Pred(Q) subsumes the result set of Pred(P).

Occasionally, as denoted by dashed lines around block 84, the ability to remove a quantifier (e.g., Q) from the query may require further determination. For example, the query may be evaluated to detect whether one or more quantifier columns of the sub-expression referenced relative to the quantifier to be removed (Q) are selected as an output of the query. If necessary, the query may be reformed to replace the selection of the one or more quantifier columns with like columns referenced relative to quantifier P.

Further, the presence of the predicate set Pred(Q) in a query may affect query output cardinality. In order to ensure that the removal of a set of references to the sub-expression neither increases nor decreases the output cardinality, in those instances where output cardinality is material, the query may be examined for the presence of the DISTINCT operator. If maintenance of the output cardinality is material, the query may be reformed to remove a quantifier and, hence, the set of references relative to the quantifier, only if the DISTINCT operator is present.

As is further apparent to those skilled in the art, when reforming the query, it may be necessary to rewrite the set of references for the remaining quantifier to maintain cardinality or otherwise. In the example provided above, the set of references was rewritten to provide the additional predicate "P1.C1 IS NOT NULL".

While this invention is primarily discussed as a method, a person of ordinary skill in the art understands that the apparatus discussed above with reference to a computer-implemented database processing system may be programmed or configured to enable the practice of the method of embodiments of the present invention. Moreover, an article of manufacture for use with a data processing system, such as a prerecorded storage device or other similar computer readable medium including program instructions recorded thereon may direct the data processing system to facilitate the practice of the method of embodiments of the present invention. It is understood that such apparatus and articles of manufacture also come within the scope of the invention.

What is claimed is:

1. A computer-implemented method for optimizing a query in a relational database management system, wherein the computer performs the following functions comprising:
    evaluating the query to determine whether a sub-expression of the query is being joined to itself and whether a predicate of the query comprises an equality test between a same column of the sub-expression;
    determining whether a first row set producible from a first set of references of the query to the sub-expression is subsumed by a second row set producible from a second set of references of the query to the sub-expression; and
    reforming the query to eliminate the joining of the sub-expression to itself based on evaluation of the query and determination of whether the first row set is subsumed by the second row set.

2. The method as claimed in claim 1, further comprising:
    determining removability of the second set of references from the query, wherein reformation of the query is further based on determination of the removability of the second set of references.

3. The method as claimed in claim 2, wherein the query comprises a first quantifier and a second quantifier each ranging over the sub-expression, and wherein determining removability of the second set of references is based on:
    detecting, as an output of the query, one or more quantifier columns referenced relative to the second quantifier.

4. The method as claimed in claim 3, further comprising:
    reforming the query to replace the one or more quantifier columns referenced relative to the second quantifier based on detection of the output of the query.

5. The method as claimed in claim 2, wherein determining removability of the second set of references is based on:
    detecting a cardinality condition of an output of the query.

6. The method as claimed in claim 1, wherein the query comprises a first quantifier and a second quantifier each ranging over the sub-expression, and wherein reforming the query comprises:
    removing the second quantifier from the query.

7. The method as claimed in claim 6, wherein reforming the query further comprises:
    rewriting the first set of references in response to the elimination of the joining of the sub-expression to itself.

8. The method as claimed in claim 1, wherein reforming the query comprises:
    rewriting the first set of references in response to the elimination of the joining of the sub-expression to itself.

9. The method as claimed in claim 1, wherein the sub-expression is selected from the group consisting of base table, materialized view, and derived table.

10. A computer readable medium containing a computer program for optimizing a query in a relational database management system, the computer program comprising program instructions for:
    evaluating the query to determine whether a sub-expression of the query is being joined to itself and whether a predicate of the query comprises an equality test between a same column of the sub-expression;
    determining whether a first row set producible from a first set of references of the query to the sub-expression is subsumed by a second row set producible from a second set of references of the query to the sub-expression; and
    reforming the query to eliminate the joining of the sub-expression to itself based on evaluation of the query and determination of whether the first row set is subsumed by the second row set.

11. The computer readable medium as claimed in claim 10, wherein the computer program further comprises program instructions for:
    determining removability of the second set of references from the query, wherein reformation of the query is further based on determination of the removability of the second set of references.

12. The computer readable medium as claimed in claim 11, wherein the query comprises a first quantifier and a second quantifier each ranging over the sub-expression, and wherein determining removability of the second set of references is based on:
    detecting, as an output of the query, one or more quantifier columns referenced relative to the second quantifier.

13. The computer readable medium as claimed in claim 12, wherein the computer program further comprises program instructions for:
    reforming the query to replace the one or more quantifier columns referenced relative to the second quantifier based on detection of the output of the query.

14. The computer readable medium as claimed in claim 11, wherein determining removability of the second set of references is based on:
    detecting a cardinality condition of an output of the query.

15. The computer readable medium as claimed in claim 10, wherein the query comprises a first quantifier and a second quantifier each ranging over the sub-expression, and wherein reforming the query comprises:
    removing the second quantifier from the query.

16. The computer readable medium as claimed in claim 15, wherein reforming the query further comprises:

rewriting the first set of references in response to the elimination of the joining of the sub-expression to itself.

17. The computer readable medium as claimed in claim 10, wherein reforming the query comprises:

rewriting the first set of references in response to the elimination of the joining of the sub-expression to itself.

18. The computer readable medium as claimed in claim 10, wherein the sub-expression is selected from the group consisting of base table, materialized view, and derived table.

19. A computer-implemented query optimizer system for optimizing a query in a relational database management system, wherein the computer performs the following functions comprising:

means for evaluating the query to determine whether a sub-expression of the query is being joined to itself and whether a predicate of the query comprises an equality test between a same column of the sub-expression;

means for determining whether a first row set producible from a first set of references of the query to the sub-expression is subsumed by a second row set producible from a second set of references of the query to the sub-expression; and means for reforming the query to eliminate the joining of the sub-expression to itself based on the means for evaluating the query and the means for determining whether the first row set is subsumed by the second row set.

20. The query optimizer system as claimed in claim 19, further comprising:

means for determining removability of the second set of references from the query, wherein the means for reforming the query is further based on the means for determining removability of the second set of references.

21. The query optimizer system as claimed in claim 20, wherein the query comprises a first quantifier and a second quantifier each ranging over the sub-expression, and wherein the means for determining removability of the second set of references is based on:

means for detecting, as an output of the query, one or more quantifier columns referenced relative to the second quantifier.

22. The query optimizer system as claimed in claim 21, further comprising:

means for reforming the query to replace the one or more quantifier columns referenced relative to the second quantifier based on the means for detecting the output of the query.

23. The query optimizer system as claimed in claim 20, wherein the means for determining removability of the second set of references is based on:

means for detecting a cardinality condition of an output of the query.

24. The query optimizer system as claimed in claim 19, wherein the query comprises a first quantifier and a second quantifier each ranging over the sub-expression, and wherein the means for reforming the query comprises:

means for removing the second quantifier from the query.

25. The query optimizer system as claimed in claim 24, wherein the means for reforming the query further comprises:

means for rewriting the first set of references in response to the elimination of the joining of the sub-expression to itself.

26. The query optimizer system as claimed in claim 19, wherein the means for reforming the query comprises:

means for rewriting the first set of references in response to the elimination of the joining of the sub-expression to itself.

27. The query optimizer system as claimed in claim 19, wherein the sub-expression is selected from the group consisting of base table, materialized view, and derived table.

* * * * *